United States Patent
Utter et al.

(10) Patent No.: US 11,029,711 B2
(45) Date of Patent: Jun. 8, 2021

(54) DRAIN ASSEMBLY FOR FLUID TANK AND RELATED METHODS

(71) Applicant: Michael Utter, Arcadia, FL (US)

(72) Inventors: Michael Utter, Arcadia, FL (US); Shaun Stuart, Zolfo Springs, FL (US)

(73) Assignee: Michael Utter, Arcadia, FL (US)

( * ) Notice: Subject to any disclaimer, the term of this patent is extended or adjusted under 35 U.S.C. 154(b) by 0 days.

(21) Appl. No.: 16/445,882

(22) Filed: Jun. 19, 2019

(65) Prior Publication Data
US 2019/0391603 A1    Dec. 26, 2019

Related U.S. Application Data

(60) Provisional application No. 62/687,328, filed on Jun. 20, 2018.

(51) Int. Cl.
*G05D 9/02*       (2006.01)
*B63B 35/26*      (2006.01)
*A01K 97/05*      (2006.01)

(52) U.S. Cl.
CPC .............. *G05D 9/02* (2013.01); *A01K 97/05* (2013.01); *B63B 35/26* (2013.01)

(58) Field of Classification Search
CPC .......... G05D 9/02; A01K 97/05; B63B 35/26; B63B 13/00; B65D 90/00
USPC ........................................ 43/56, 57; 114/197
See application file for complete search history.

(56) References Cited

U.S. PATENT DOCUMENTS

| | | | | |
|---|---|---|---|---|
| 1,123,888 A | * | 1/1915 | Kempf | E03F 1/003 405/42 |
| 1,761,645 A | | 6/1930 | Sobolew | |
| 1,996,279 A | * | 4/1935 | Dillon | E03C 1/264 4/292 |
| 2,266,043 A | * | 12/1941 | Hutchins | E03C 1/244 4/687 |
| 3,028,611 A | * | 4/1962 | Scaccia, Jr. | A01K 97/05 114/343 |

(Continued)

FOREIGN PATENT DOCUMENTS

JP    S63232097    9/1988

OTHER PUBLICATIONS

"Clearview Baitwell Filters" http://clearviewbaitwellfilters.com; retreived from Internet Jun. 14, 2019; 1 pg.

(Continued)

*Primary Examiner* — Angelisa L. Hicks
(74) *Attorney, Agent, or Firm* — Allen, Dyer, Doppelt + Gilchrist, PA

(57) ABSTRACT

A drain assembly for a fluid tank having a drain hole therein may include a hollow first member to be coupled with the drain hole, where the hollow first member has at least one opening therein. The drain assembly may further include a hollow second member slidably coupled with the hollow first member and movable along a longitudinal axis of the hollow outer member between first and second positions. The hollow second member may be configured to seal the at least one opening in the hollow first member when in the first position to define an upper spillover level for fluid within the tank, and to unseal the at least one opening in the hollow first member when in the second position to define a lower spillover level for fluid within the tank below the upper spillover level.

20 Claims, 7 Drawing Sheets

(56) References Cited

U.S. PATENT DOCUMENTS

| | | | | |
|---|---|---|---|---|
| 3,078,612 | A | | 2/1963 | Wait |
| 3,084,472 | A | | 4/1963 | Feik |
| 3,595,269 | A | * | 7/1971 | Yeagle .................... F16L 55/00 137/577 |
| 4,034,428 | A | * | 7/1977 | Jacuzzi .................... A47K 1/14 29/221.6 |
| 5,246,202 | A | * | 9/1993 | Beamer ............. B60H 1/00328 165/71 |
| 6,200,212 | B1 | * | 3/2001 | Henry .................... A01K 97/04 43/56 |
| 6,237,639 | B1 | * | 5/2001 | Jougla .................... B63B 13/00 114/197 |
| 6,631,588 | B1 | * | 10/2003 | Distler ................ E04D 13/0409 210/163 |
| 7,703,613 | B2 | * | 4/2010 | Haslem ................. B67D 7/061 210/513 |
| 8,833,734 | B2 | * | 9/2014 | Patel ....................... B63B 35/26 251/345 |
| 9,426,949 | B1 | * | 8/2016 | Epstein ................ A01K 63/003 |
| 9,743,653 | B2 | | 8/2017 | Sarnowski et al. |
| 2005/0199285 | A1 | * | 9/2005 | Jones .................... H01M 2/362 137/386 |
| 2009/0050043 | A1 | * | 2/2009 | Alvarez ................. B63B 13/00 114/197 |
| 2018/0195288 | A1 | * | 7/2018 | Huber ................ E04D 13/0409 |

OTHER PUBLICATIONS

TH Marine "Livewell Overflow Drain Tubes" ttps://thmarinesupplies.com/collections/livewell-overflow-drain-tubes; retreived from internet Jun. 14, 2019; 1 pg.

* cited by examiner

DRAIN ASSEMBLY FOR FLUID TANK AND RELATED METHODS

TECHNICAL FIELD

The present disclosure generally relates to drain assemblies for fluid tanks, such as live well aeration tanks, and related methods.

BACKGROUND

Live wells on fishing boats typically have a drain hole in the bottom of the well which allows water to drain out of the boat when a plug is removed. In many boats, an overflow tube or stem is used as the plug, which sets the height of the water that will stay in the live well. That is, once water fills up to the opening in the top of the tube, such as from a pump that pumps water from outside the boat into the live well, it spills over into the tube and goes out the drain hole.

One example drain system for a live well is set forth in U.S. Pat. No. 9,743,653 to Sarnowski et al. This patent discloses a drain system having a body adjustably coupled to a drain. The body can be rotated along its threads and engage a seal in the drain to substantially prevent water from flowing out of the drain. When rotated the opposite direction, the body can be spaced from the seal and allow water to flow out of the drain. The drain can also include holes that allow water to flow into the drain when the body is rotated to be spaced from the seal.

Despite the existence of such systems, further features and functionality may be desirable for live wells or others aquatic animal retention tanks in certain applications.

SUMMARY

A drain assembly for a fluid tank having a drain hole therein may include a hollow first member to be coupled with the drain hole, where the hollow first member has at least one opening therein. The drain assembly may further include a hollow second member slidably coupled with the hollow first member and movable along a longitudinal axis of the hollow outer member between first and second positions. The hollow second member may be configured to seal the at least one opening in the hollow first member when in the first position to define an upper spillover level for fluid within the tank, and to unseal the at least one opening in the hollow first member when in the second position to define a lower spillover level for fluid within the tank below the upper spillover level.

In an example embodiment, the hollow first member may have a groove therein defining first and second locking positions respectively corresponding to the first and second positions of the hollow second member, and the hollow second member may have a locking pin coupled thereto movable within the groove of the hollow first member between the first and second locking positions as the hollow second member is rotated about the longitudinal axis of the hollow first member. In accordance with another example, the hollow second member may telescope into the hollow first member.

By way of example, the hollow first and second members may be tubular and coaxial. In an example implementation, the hollow second member may also have a proximal end slidably coupled with the hollow first member and a distal end spaced apart from the hollow first member, and the drain assembly may further include a strainer cage coupled to the distal end of the hollow second member. By way of example, the strainer cage may include a plurality of spaced apart ribs along an outer surface of the hollow second member, and a cover coupled to the ribs and spaced apart from the hollow second member by the ribs and defining fluid channels between the ribs. Furthermore, the cover may have a plurality of slits therein laterally offset from the ribs. Additionally, the strainer cage may further include a cap covering the distal end. In some embodiments where the drain hole is threaded, the hollow first member may have a threaded end portion configured to threadably engage the threaded drain hole.

DETAILED DESCRIPTION

Figure 1:
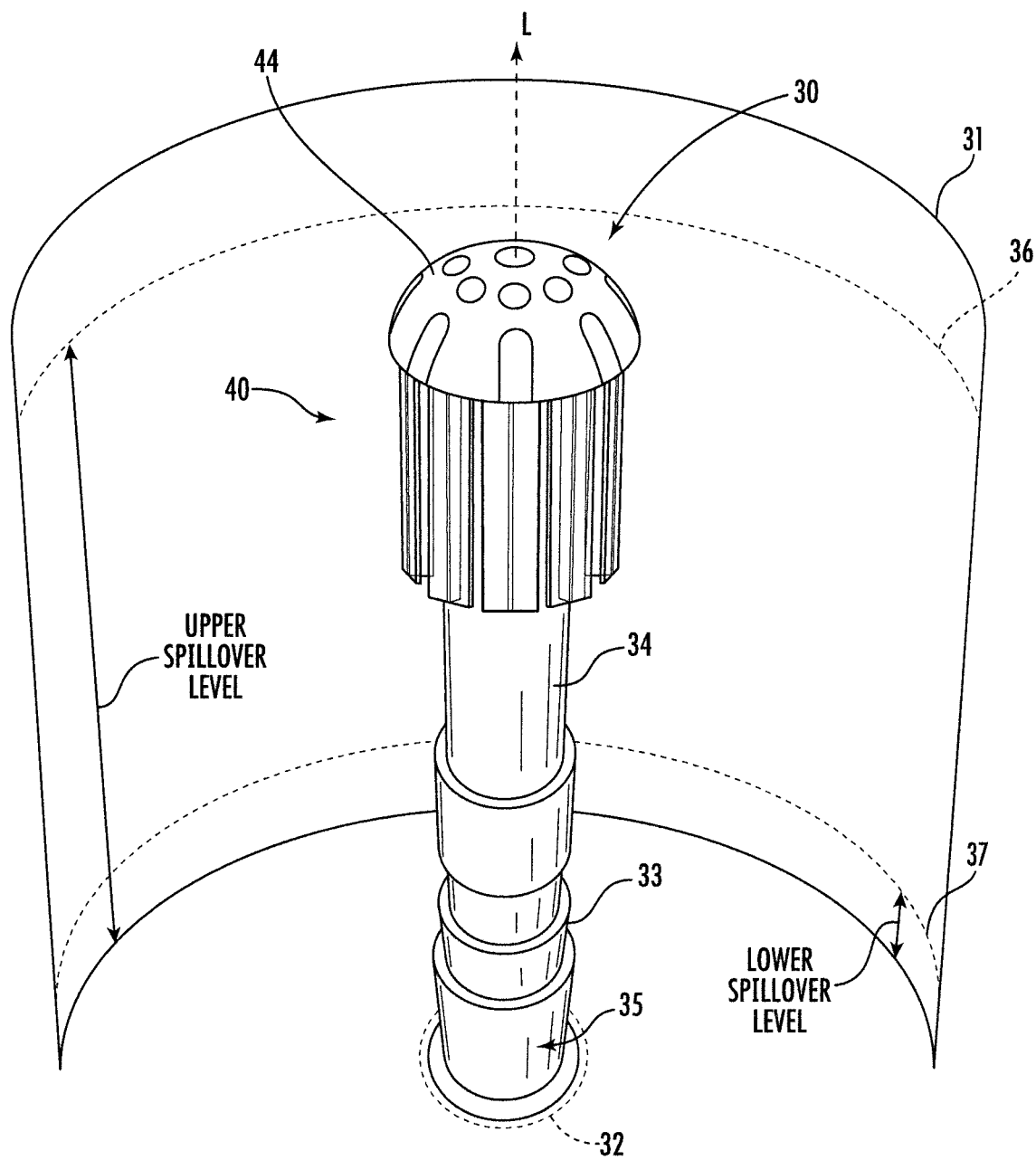
FIG. 1 is a perspective view of a drain assembly for a fluid tank in accordance with an example embodiment.

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in different embodiments.

Referring initially to FIGS. 1-5 and 7-8, a drain assembly 30 is first described which may be used with boat livewells or other fluid tanks 31 (e.g., fish tanks, aquatic plant tanks, etc.) having a drain hole 32 therein. The drain assembly 30 illustratively includes a hollow first or outer member 33 (defining a lower/bottom or base portion of the drain assembly) to be inserted within the drain hole 32 of the livewell 33 or other tank. The hollow outer member 31 has one or more openings 35 extending through the sidewall thereof.

Figures 7, 8:
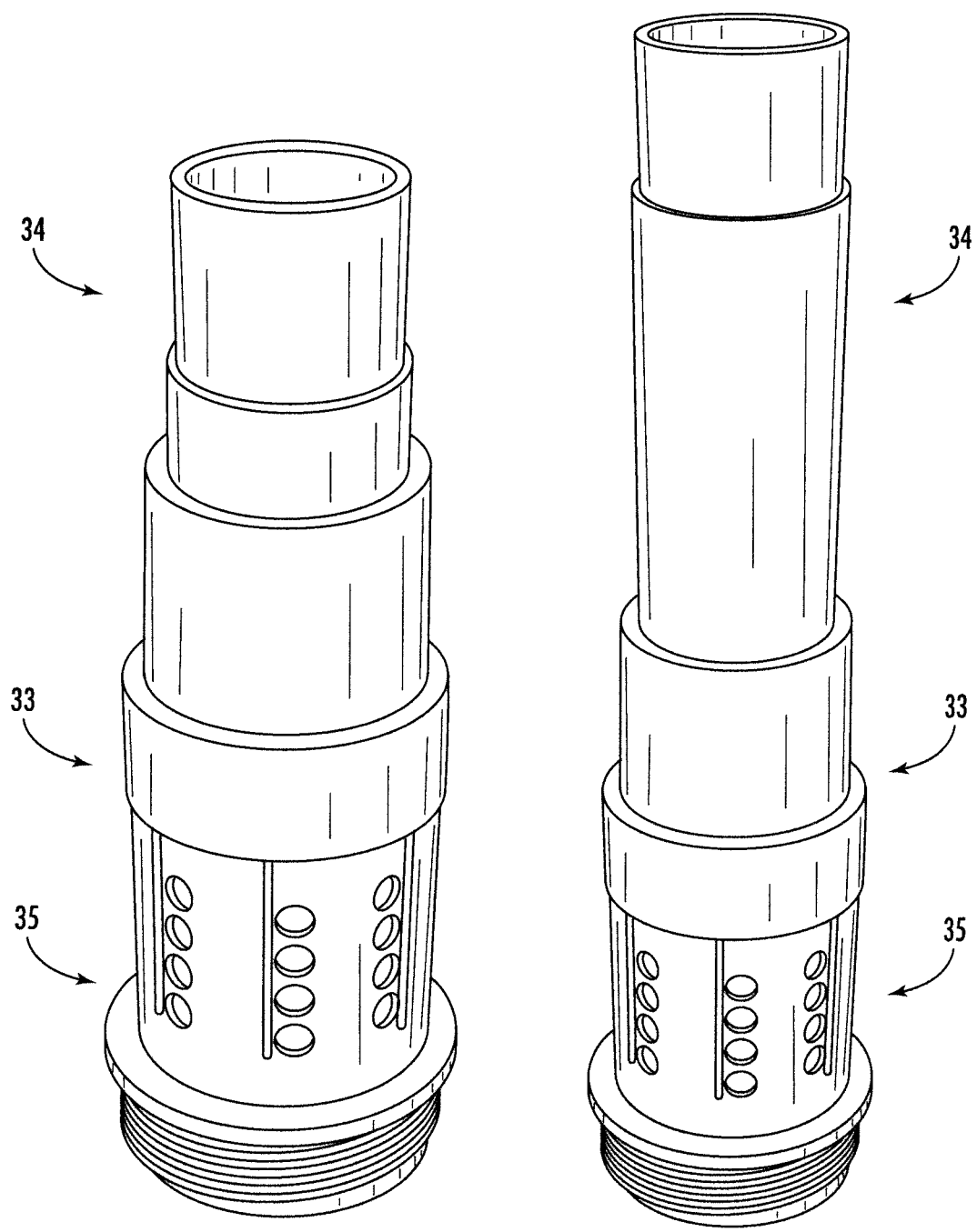
FIGS. 7 and 8 are side views of the drain assembly of FIG. 1 with the upper portion removed illustrating a side draining feature at the bottom of the drain assembly in closed and open positions, respectively.

Furthermore, the drain assembly 30 also illustratively includes a hollow second or inner member 34 (defining an upper/top portion or overflow pipe of the drain assembly) carried within the hollow outer member 33 and movable along a longitudinal axis L of the hollow outer member between first and second positions shown in FIGS. 7 and 8, respectively. The hollow inner member 34 may be configured to seal the opening(s) 35 in the hollow outer member 33 when in the first position (FIG. 7) to define an upper spillover level 36 for fluid within the tank 31. Furthermore, the hollow inner member 34 is also configured to unseal the opening(s) in the hollow outer member when in the second position (FIG. 8) to define a lower spillover level 37 for fluid within the tank 31, which is below the upper spillover level 36 but above the bottom of the tank.

In other words, when the hollow inner member 34 is in the first (here lowered) position, the openings 35 are sealed so that the top of the hollow inner member becomes the overflow, allowing water (or other fluid) to flow down through the inner and outer members 34, 33 and out the drain hole 32 (and thereby defining the upper spillover level 36 in the tank 31). Conversely, when the hollow inner member 33 is in the second (here raised) position (FIG. 8), the openings 35 are unsealed so that water or other fluid in the tank 31 is allowed to flow into the drain hole 32 of the tank through these openings, thus defining the lower spillover level 37 in the tank. The height of the lower spillover level 37 is determined by how far up the hollow outer member 33 the openings 35 are positioned.

Advantageously, this configuration allows for two different spillover levels 36, 37 to be quickly and easily set for the tank 31 using the same drain assembly 30, yet without having to remove the drain assembly from the drain hole 32. That is, by sliding the inner member 34 up and down between the first and second positions (like a plunger or syringe), the fill level within the tank 31 may be quickly changed between the upper and lower spillover levels 36, 37 as desired. It should be noted that in the example embodiment the inner and outer members 34, 33 are both pipes (i.e., tubular) and are coaxial along the axis L, but in other embodiments different shapes may be used (e.g., rectangular, etc.).

In the illustrated example, the top of the hollow inner member 34 has a protective strainer cage 40 thereon which functions as a strainer or sieve to keep bait or debris (e.g., weeds, etc.) from getting into the inner member and clogging it or the drain hole 32 up. In the illustrated example, the cage assembly 40 includes a plurality of T-shaped extensions 41 including ribs 42 spaced apart and around a perimeter of the overflow tube at the upper end (FIGS. 3-5) each carrying a respective slat or strip 43, and a cap or cap assembly 44 that rests on the tops of the T-shaped extensions and covers the upper opening 45 in the inner member 34. The slats 43 together form a cover spaced apart from inner member 34 by the ribs 42. Various configurations of the cage 40 and cap 44 may be used. For example, the ribs, 42, slats 43 and/or cap 44 may be formed as individual pieces, or some or all of these pieces may be integrally formed as a unitary or monolithic body to be attached to the inner member 34.

Figure 5:
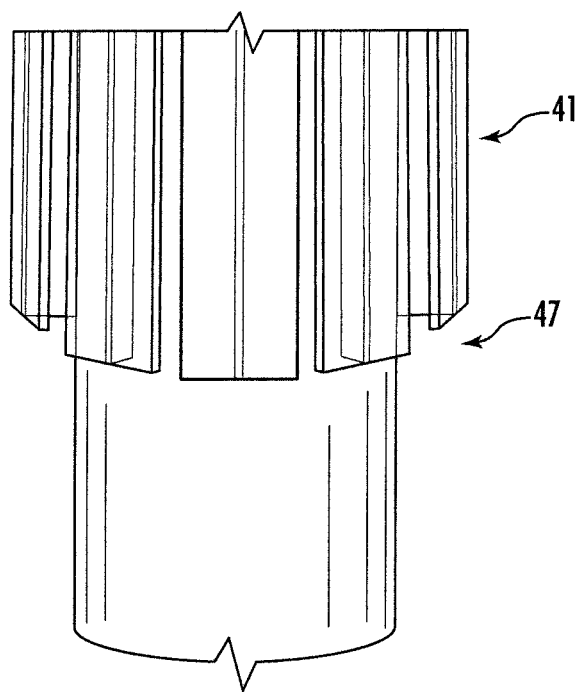
FIG. 5 is a side view of the upper end of the drain assembly of FIG. 1 illustrating an inward taper in the overflow pipe to allow water entry from the bottom of the protective cage.

The ribs or bases 42 of the T-shaped extensions 41 are spaced apart (e.g., a centimeter or less) along the outer surface or perimeter of the inner member 34 to define water flow channels 46 to allow water to enter from the bottom of the cage 40 and travel up these channels to the top of the inner member 34 into the upper opening 45. In this regard, the inner member 34 may optionally have an inward taper 47 at the point where the T-shaped extensions 41 begin along the inner member 34 (see FIG. 5). This is shown in FIG. 5. Yet, the outer facing slats or portions 43 of the T-shaped extensions are relatively close to one another (e.g., 3 millimeters or less, or even touching in some embodiments), which helps to prevent bait or debris in the live well such as weeds, etc., from laterally entering in through the cage 40.

Yet, water is able to enter into the channels 46 at the inward taper 47 at the bottom of the cage, even if weeds, etc., clog the cap or sides of the cage.

By way of example, the height of the T-shaped extensions 41 (i.e., the distance the ribs 42 extend outward from the surface of the inner member 34) may be in a range of a centimeter or less, although it should be noted that the dimensions provided herein for the T-shaped extensions may be different in different embodiments, and may be sized for use with different sizes of drain assemblies 30, as well as types of bait or debris encountered in different situations, for example.

The T-shaped extensions 41 may be attached to the inner member 34 by an adhesive, or in some embodiments may be integrally molded with or brazed onto the inner member, for example. Also, the T-shaped extensions 41 that form the cage 40 need not always be T-shaped. For example, an L-shaped or V-shaped extension (i.e., with angled ribs 32 and with or without the slats 43) could also be used in some embodiments.

Figure 2:
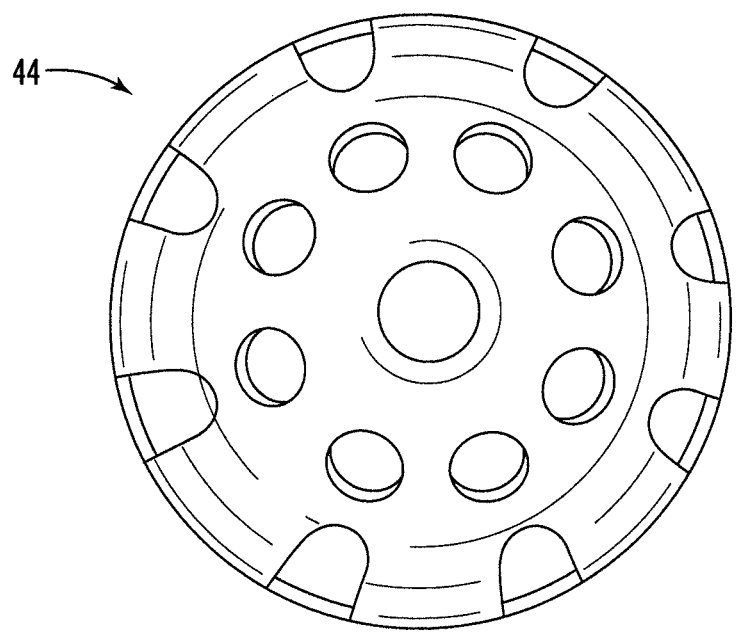
FIG. 2 is a top view of the drain assembly of FIG. 1.
Figure 3:
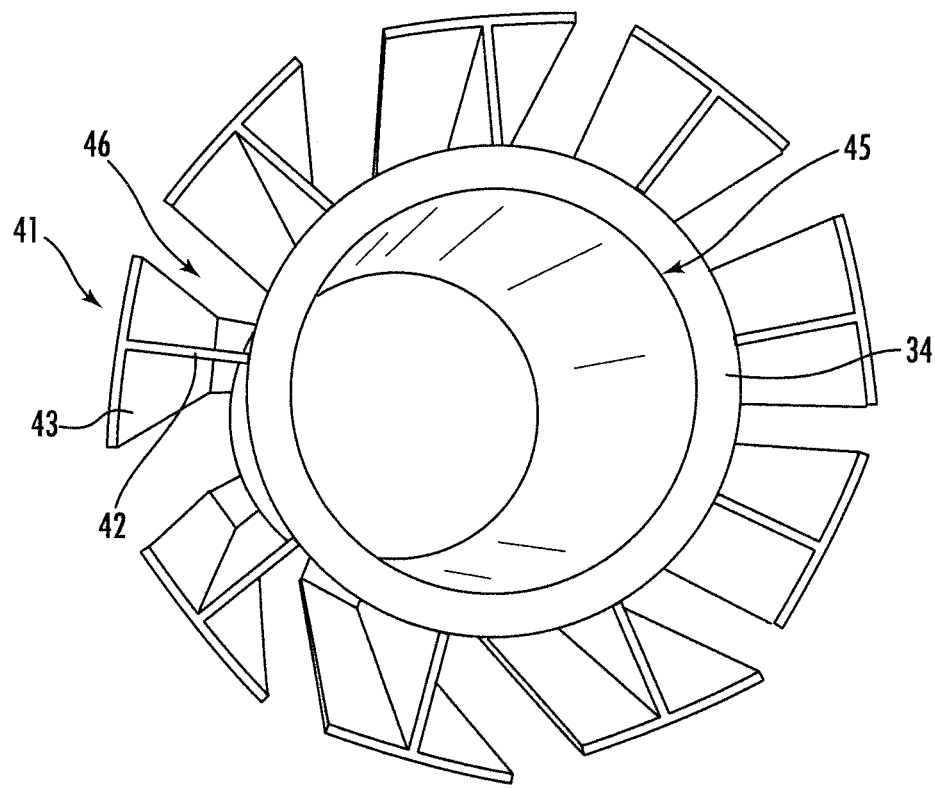
FIG. 3 is a top view of the drain assembly of FIG. 1 with the spherical strainer cap removed to expose T-shaped extensions around a perimeter of the drain pipe forming a protective cage to prevent clogging.
Figure 4:
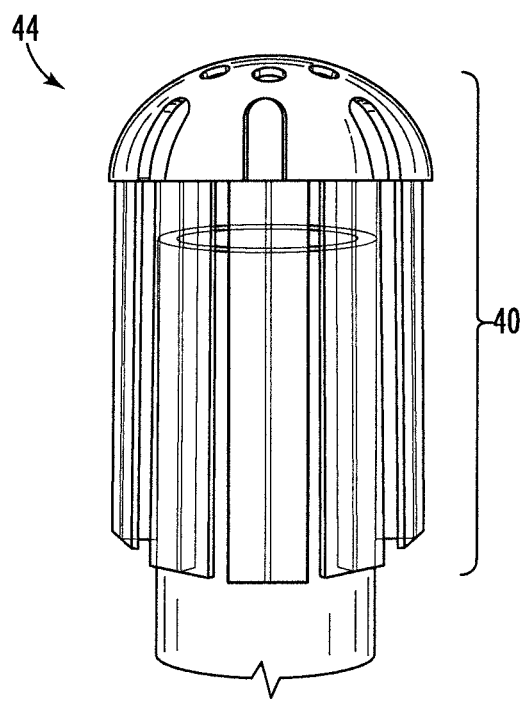
FIG. 4 is a side view of the upper end of the drain assembly of FIG. 1.
Figure 6:
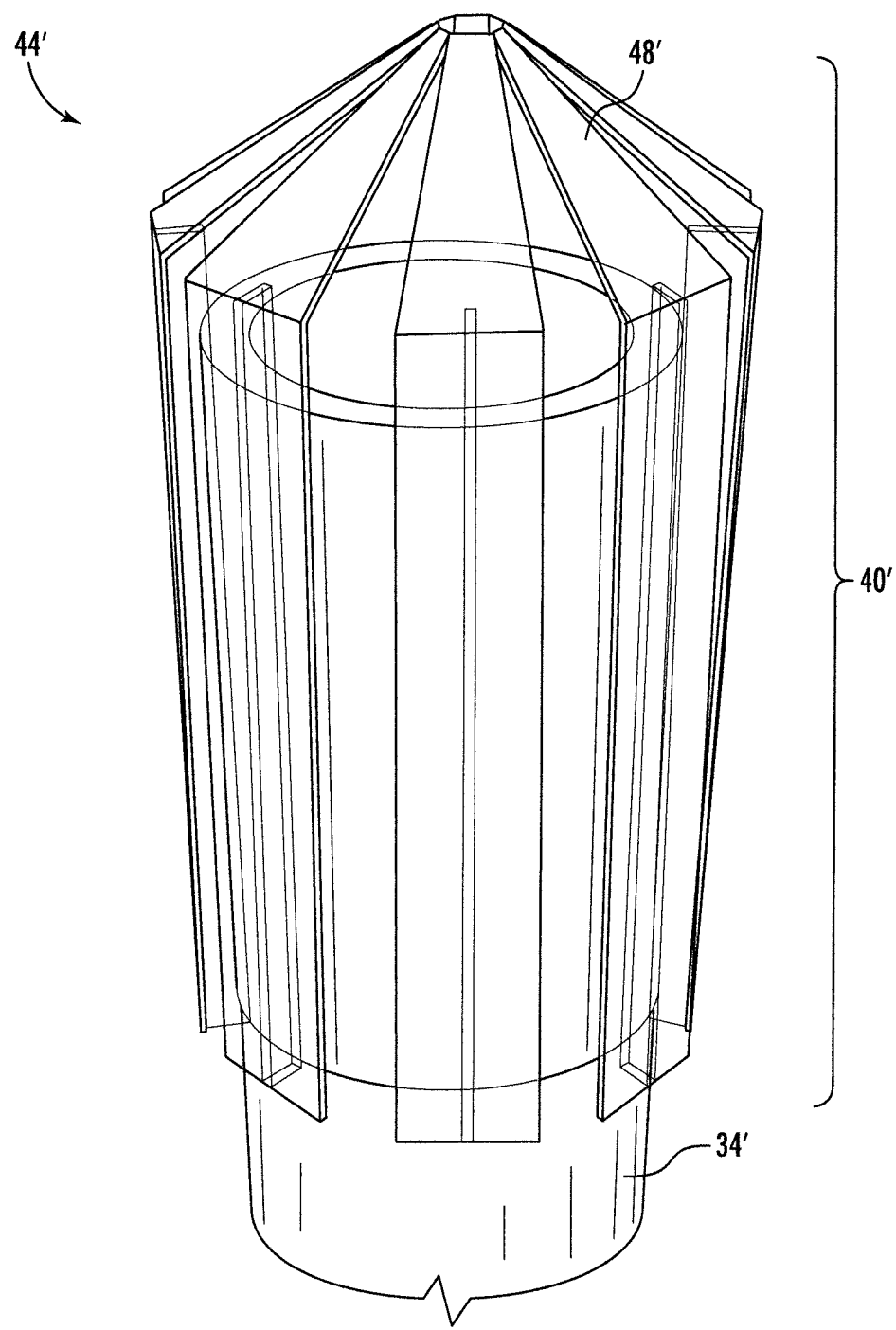
FIG. 6 is a side view of the upper end of an alternative embodiment of the drain assembly of FIG. 4 including a sloped strainer cap configuration.

Similarly, in FIGS. 1, 2, and 4 the cap 44 is in the shape of the top portion of a sphere. However, other cap 44' shapes may also be used, such as in the example embodiment shown in FIG. 6 where a plurality of slats or panels 48' extend upward to a common point from the tops of the T-shaped extensions 41' resembling a pyramid. Here again, the spacing between the panels 48' is small such that it allows water to flow in (e.g., a few millimeters or less), but helps keep bait and debris from entering. Again, if these openings in the cap 44' become clogged with weeds, etc., water can still get to the upper opening of the inner member 34' by coming up from the channels below, as noted above.

Referring additionally to FIGS. 7-8, another advantageous aspect of the drain assembly 30 is at the bottom of the outer member 33 that plugs or screws into the drain hole 32 in the live well (or other tank) 31. More particularly, the outer member 33 of the drain assembly serves as a plug which has a two-piece plunger configuration, such that when the upper (inner) member 34—i.e., the overflow pipe—is pushed down (FIG. 7) it seals off the openings 35 so no water can escape through the sidewall of the outer (lower) member 33. As such, water will fill up to the upper spillover level 36 noted above. This plunger assembly may include one or more rubber/silicone O-rings or other sealing members therein, as will be appreciated by those skilled in the art.

However, when the inner member 34 of the assembly 30 is pulled upward (FIG. 8), the opening(s) 35 in the outer member 33 are unsealed to allow water or other fluid to drain down to the lower spillover level 37 set by the height of the openings. For example, this height may be set to a level of one to three inches, so that when the inner member 34 is raised water in the live well 31 drains down to this lower spillover level 37. This makes it easier to catch live bait in the well 31, such as to remove them at the end of a day of fishing, yet without removing the entire drain assembly 30 from the live well drain which would allow bait or other debris to go down the drain hole 32 and get stuck/clog the drain hole. Alternatively, it may be desirable to use the lower spillover or fill level 37 with certain types of smaller bait, such as shrimp, etc., which do not require as much water as larger baitfish, for example.

Figure 9:
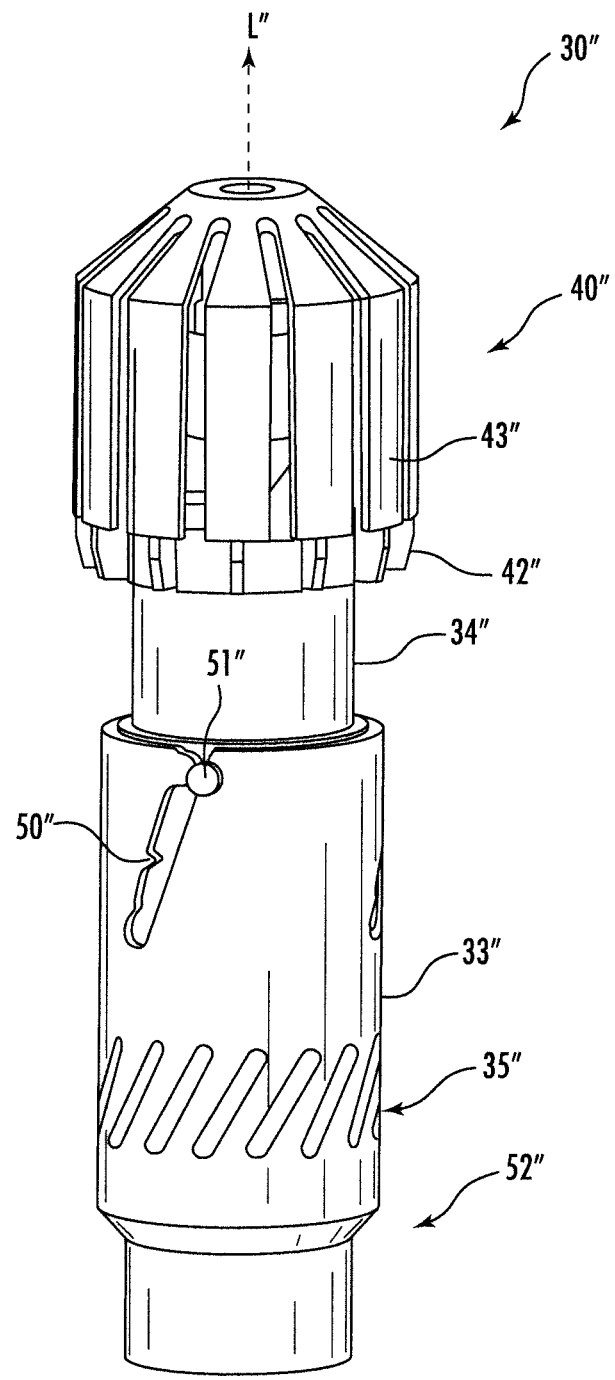
FIG. 9 is a perspective view of drain assembly in accordance with another example embodiment.
Figure 10:
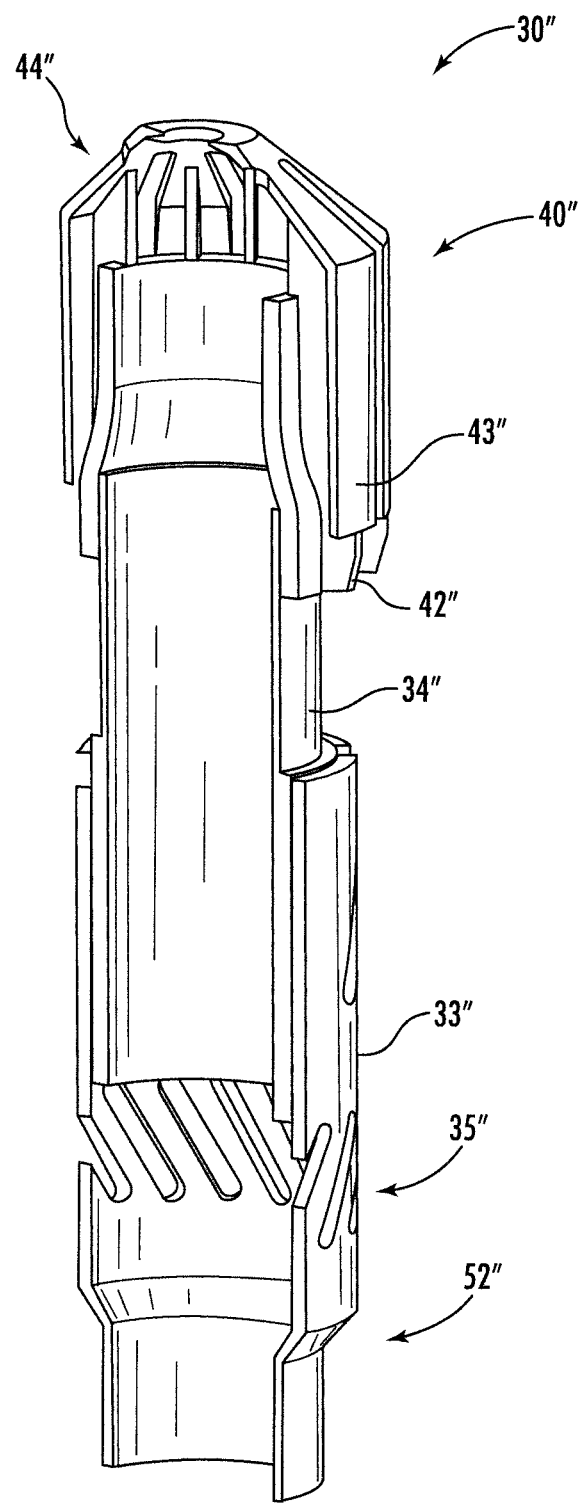
FIG. 10 is a cutaway view of the drain assembly of FIG. 9.

Turning now to FIGS. 9 and 10, in another advantageous embodiment of the drain assembly 30'', the inner member 34'' may screw or twist down into the outer portion 33' (exposing the side openings 35'' when unscrewed), as opposed to the plunger configuration shown in FIGS. 7-8, yet achieve a similar result. It should also be noted that various sizes and configurations of the drain assembly may be used in different embodiments, such as for different styles and sizes of live wells. In the illustrated example, the outer member 33" has a groove 50" therein defining first and second locking positions (notches in the top and bottom of the groove) respectively corresponding to the first and second positions of the hollow inner member 34". Moreover, the hollow inner member 34" may have a locking pin 51" coupled thereto movable within the groove 50" of the hollow outer member 33" between the first and second locking positions as the hollow inner member is rotated about the longitudinal axis L" of the hollow outer member. In the views shown in FIGS. 9 and 10, the inner member 34" is in the second (raised) position, setting the fluid fill level to the lower spillover level as described above. In the illustrated example, the outer member 33" further illustratively includes a reduced diameter end portion 52" that fits within the drain hole.

It should be noted that the drain assemblies described herein may be made in various different sizes and configurations. For example, a smaller drain assembly may be appropriate for bass or bay boats with smaller capacity or shorter live wells, as compared with offshore fishing vessels which generally have much larger capacity/taller live wells. Moreover, although a vertical drain assembly is shown in the illustrated examples in which the drain hole 32 is located in the bottom of the tank 31, some live wells have side drain holes (rather than a bottom drain). For such live wells, the drain assembly 30 may have a bend or elbow or other suitable adapter piece, and opening and closing of the openings 35 could be performed through a horizontal motion, rather than the vertical plunger motion described above. For example, the inner member 34 could have a 90 degree bend therein, and the lower (horizontal) portion could slide (or rotate) sideways in and out of the outer member 33.

In addition, while the first member 33 has been described as the outer member, and the second member 34 has been described as the inner member above, in some embodiments these may be reversed. That is, the second member 34 could be on the outside of the first member 33, and accordingly seal or unseal the openings 35 from the outside as it slides up and down over the first member.

The drain assembly 30 may be made of various types of materials, such as PVC, molded plastics, metal, etc. As seen in FIGS. 7-8, the first member 33 of the drain assembly 30 may be threaded for use with a threaded drain hole 32. However, the drain assembly 30 may also be used with non-threaded drain holes as well in different embodiments, and various adapters may also be used as appropriate to connect the first member 33 with different types of drain holes 32, as will be appreciated by those skilled in the art. Again, while the drain assembly 30 has been described herein with reference to live well applications, it will be appreciated that the drain assembly may also be used in other applications for aquatic animals, such as fish or reptile tanks, etc.

Many modifications and other embodiments of the invention will come to the mind of one skilled in the art having the benefit of the teachings presented in the foregoing descriptions and the associated drawings, which are provided by way of example. Therefore, it is understood that the disclosure is not to be limited to the specific embodiments disclosed, and that other modifications and embodiments are intended to be included within the scope of the appended claims.

That which is claimed is:

1. A drain assembly for a fluid tank having a drain hole therein, the drain assembly comprising:
   a hollow first member to be coupled with the drain hole, the hollow first member having at least one opening therein; and
   a hollow second member slidably coupled with the hollow first member and movable along a longitudinal axis of the hollow first member between first and second positions;
   wherein the hollow second member is configured to seal the at least one opening in the hollow first member when in the first position to define an upper spillover level for fluid within the tank, and wherein the hollow second member is configured to unseal the at least one opening in the hollow first member when in the second position to define a lower spillover level for fluid within the tank below the upper spillover level.

2. The drain assembly of claim 1 wherein the hollow first member has a groove therein defining first and second locking positions respectively corresponding to the first and second positions of the hollow second member; and wherein the hollow second member has a locking pin coupled thereto movable within the groove of the hollow first member between the first and second locking positions as the hollow second member is rotated about the longitudinal axis of the hollow first member.

3. The drain assembly of claim 1 wherein the hollow second member telescopes into the hollow first member.

4. The drain assembly of claim 1 wherein the hollow first and second members are tubular.

5. The drain assembly of claim 1 wherein the hollow first and second members are coaxial.

6. The drain assembly of claim 1 wherein the hollow second member has a proximal end slidably coupled with the hollow first member and a distal end spaced apart from the hollow first member; and further comprising a strainer cage coupled to the distal end of the hollow second member.

7. The drain assembly of claim 6 wherein the strainer cage comprises a plurality of spaced apart ribs along an outer surface of the hollow second member, and a cover coupled to the ribs and spaced apart from the hollow second member by the ribs and defining fluid channels between the ribs.

8. The drain assembly of claim 6 wherein the cover has a plurality of slits therein laterally offset from the ribs.

9. The drain assembly of claim 6 wherein the strainer cage further comprises a cap covering the distal end.

10. The drain assembly of claim 1 wherein the drain hole is threaded, and wherein the hollow first member has a threaded end portion configured to threadably engage the threaded drain hole.

11. A drain assembly for a fluid tank having a drain hole therein, the drain assembly comprising:
    a hollow outer member to be coupled with the drain hole;
    a hollow inner member having a proximal end carried within the hollow outer member and a distal end outside of the hollow outer member; and
    a strainer cage coupled to the distal end of the hollow inner member and comprising
       a plurality of spaced apart ribs extending longitudinally along an outer surface of the hollow inner member, and
       a cover coupled to the ribs and spaced apart from the hollow inner member by the ribs and defining fluid channels between the ribs.

12. The drain assembly of claim 11 wherein the cover has a plurality of slits therein offset laterally from the ribs.

13. The drain assembly of claim 11 wherein the hollow inner member telescopes into the hollow outer member.

14. The drain assembly of claim 11 wherein the hollow inner and outer members are tubular.

15. The drain assembly of claim 11 wherein the strainer cage further comprises a cap covering the distal end.

16. The drain assembly of claim 11 wherein drain hole is threaded, and wherein the hollow outer member has a threaded end portion configured to threadably engage the threaded drain hole.

17. A drain assembly for a fluid tank having a drain hole therein, the drain assembly comprising:
 a hollow member having a proximal end to be coupled to the drain hole and a distal end; and
 a strainer cage coupled to the distal end of the hollow member and comprising
  a plurality of spaced apart ribs extending longitudinally along an outer surface of the hollow member, and
  a cover coupled to the ribs and spaced apart from the hollow member by the ribs and defining fluid overflow channels between the ribs.

18. The drain assembly of claim 17 wherein the cover has a plurality of slits therein laterally offset from the ribs.

19. The drain assembly of claim 17 wherein the hollow member is tubular.

20. The drain assembly of claim 17 wherein the strainer cage further comprises a cap covering the distal end.

* * * * *